United States Patent [19]
Edgar et al.

[11] Patent Number: 5,563,720
[45] Date of Patent: Oct. 8, 1996

[54] EXPERT SYSTEM FOR IMAGE ENHANCEMENT

[75] Inventors: Albert D. Edgar, Austin; Steven C. Penn, Georgetown, both of Tex.

[73] Assignee: International Business Machines Corporation, Armonk, N.Y.

[21] Appl. No.: 371,935

[22] Filed: Jan. 11, 1995

Related U.S. Application Data

[63] Continuation of Ser. No. 916,245, Jul. 17, 1992.

[51] Int. Cl.⁶ .............................. H04N 1/40; G06E 1/00; G06E 3/00
[52] U.S. Cl. ..................... 358/447; 358/448; 358/537; 358/520; 395/22; 395/50
[58] Field of Search ..................... 358/447, 448, 358/452, 453, 455, 518, 530, 537, 520; 395/22, 23, 50, 51, 52, 76, 77, 131; 382/54, 57

[56] References Cited

U.S. PATENT DOCUMENTS

| | | | |
|---|---|---|---|
| 3,772,465 | 6/1971 | Vlahas | 352/38 |
| 4,335,427 | 4/1980 | Hunt | 364/414 |
| 4,606,625 | 8/1986 | Geshwind | 352/38 |
| 4,809,347 | 2/1989 | Nash et al. | 382/49 |
| 4,868,781 | 9/1989 | Kimura | 364/900 |
| 4,907,075 | 3/1990 | Braudaway | 358/75 |
| 4,984,072 | 1/1991 | Sandrew | 358/81 |
| 5,012,333 | 4/1991 | Lee et al. | 358/520 |
| 5,027,196 | 6/1991 | Ono | 358/76 |
| 5,027,291 | 6/1991 | Callahan et al. | 364/521 |
| 5,030,945 | 7/1991 | Yeomans | 340/724 |
| 5,041,992 | 8/1991 | Cunningham et al. | 364/518 |
| 5,042,078 | 8/1991 | Oshikoshi | 382/54 |
| 5,051,928 | 9/1991 | Gruters | 364/521 |
| 5,224,181 | 10/1990 | Tsutsumi | 382/61 |
| 5,265,200 | 11/1993 | Edgar | 395/131 |
| 5,271,064 | 12/1993 | Dhawan et al. | 382/54 |
| 5,295,204 | 3/1994 | Parulski | 358/479 |
| 5,305,204 | 4/1994 | Ohhashi | 364/413.13 |
| 5,319,742 | 6/1994 | Edgar | 395/131 |

FOREIGN PATENT DOCUMENTS

0544509A2   6/1993   European Pat. Off. .

OTHER PUBLICATIONS

*Proceedings Two Dimensional Digital Signal Processing Conference*, Oct. 6, 1971, Columbia, MO, "Interactive Imagery Analysis", R. Joseph, pp. 7-1-1 to 7-1-16.
Mastering Aldus Photostyler by Sybil & Emil Ring Copy right 1991 by Bantam Books.

*Primary Examiner*—Edward L. Coles, Sr.
*Assistant Examiner*—Madeleine Anh-Vinh Nguyen
*Attorney, Agent, or Firm*—Mark S. Walker; Keith Stephens

[57] ABSTRACT

A method, system and process for improving image enhancement tools through the application of expert systems. The improvements are accomplished by the operation of a process in the memory of a processor that enhances an image based on a set of criteria entered by a user. The image is enhanced in at least two ways and the two enhanced images are presented to the user. The user selects the image that appears best and the selected image is thereafter used for subsequent image enhancements according to the user criteria until a final image is created.

16 Claims, 7 Drawing Sheets

EXPERT SYSTEM FOR IMAGE ENHANCEMENT

This is a continuation of application Ser. No. 07/916,245 filed Jul. 17, 1992.

FIELD OF THE INVENTION

This invention generally relates to improvements in image processing and more particularly to enhancing images using expert system technology.

BACKGROUND OF THE INVENTION

Image enhancement has been the subject of a large body of patent art. For example, U.S. Pat. No. 4,606,625 discloses a system for colorizing black and white film in which interpolative techniques are used to reduce the number of frames which have to be individually colorized.

Another example of a prior art image enhancement is U.S. Pat. No. 4,907,075 which discloses a method for selecting a limited number of presentation colors from a larger palette for a selected image. A three dimensional color histogram of an image is generated and a first color is selected based upon the color occurring most frequently in the image. Subsequent presentation colors are selected by choosing one at a time those colors having the highest weighted frequency of occurrence wherein the weighting is such that colors closest to the previously selected color are weighted very little while colors furthest away from the selected color are weighted the most.

Still another example of an image enhancement system is found in U.S. Pat. No. 4,984,072 which discloses a system and method for color enhancing an image or a series of images such as a motion picture by digitally capturing the images, interactively defining masks corresponding to objects in the images having similar hues, creating regions from these masks, and for each region, defining a color transfer function for converting image gray-scale information to unique values of hue, luminance, and saturation. The gray-scale values within each region are then processed through that region's color transfer function, and the resulting colors applied to the image and stored for later retrieval and display.

Still another example of an imaging system is U.S. Pat. No. 5,041,992 which discloses a system and method for interactive design of user manipulable graphic elements. The system allows a user to create and manipulate graphic elements that can be subsequently employed to create a program.

None of these prior art patents or any other prior art that applicant is aware of disclose a method or system for enhancing images using expert systems technology.

SUMMARY OF THE INVENTION

Accordingly, it is a primary objective of the present invention to improve image enhancement tools through the application of expert systems.

These and other objectives of the present invention are accomplished by the operation of a process in the memory of a processor that enhances an image based on a set of criteria entered by a user. The image is enhanced in at least two ways and the two enhanced images are presented to the user. The user selects the image that appears best and the selected image is thereafter used for subsequent image enhancements according to the user criteria until a final image is created.

DETAILED DESCRIPTION OF THE INVENTION

Figure 1:
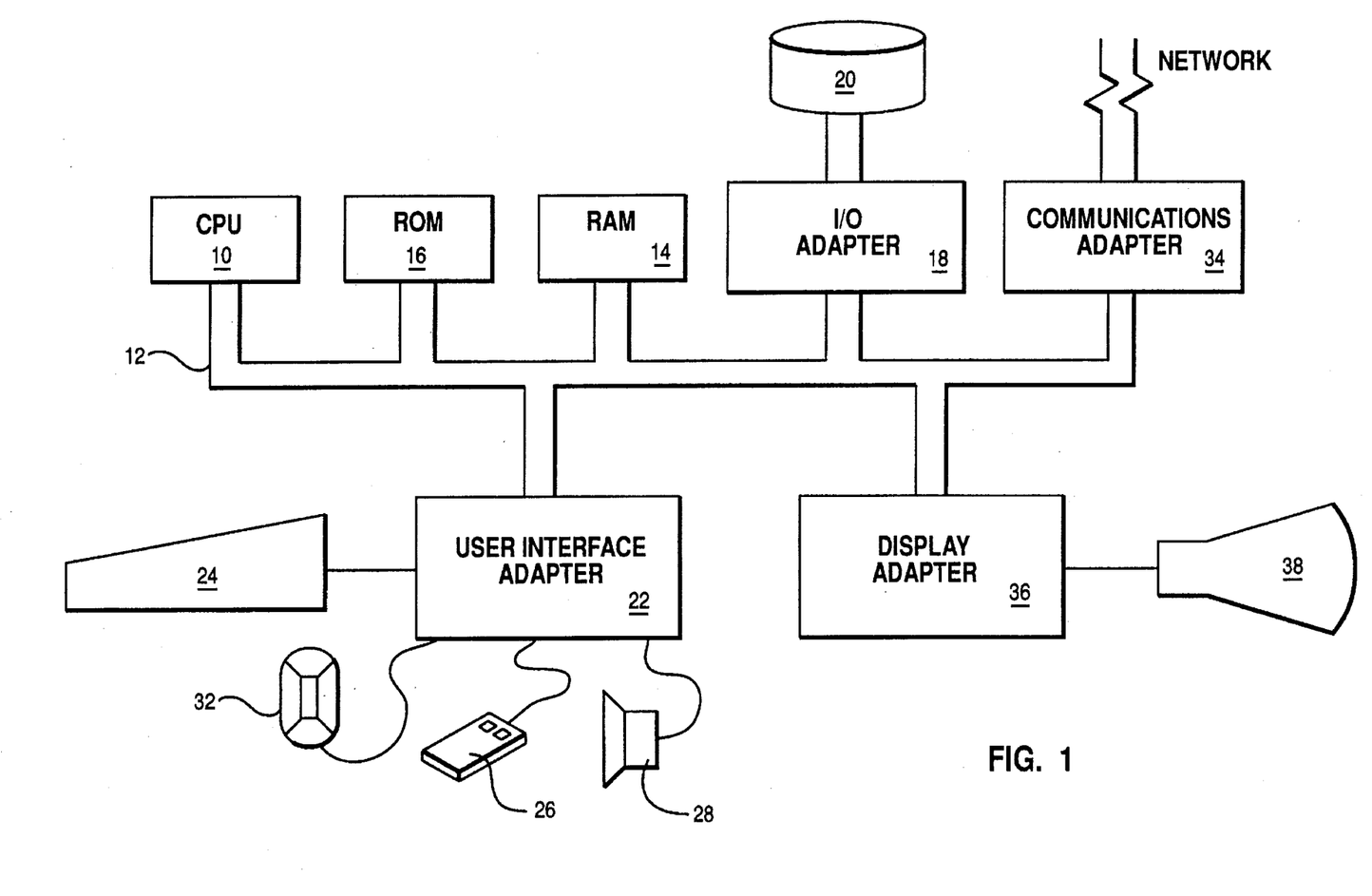
FIG. 1 is a block diagram of a personal computer system in accordance with the subject invention.

The invention is preferably practiced in the context of an operating system resident on an IBM RISC SYSTEM/6000 computer available from IBM Corporation. A representative hardware environment is depicted in FIG. 1, which illustrates a typical hardware configuration of a workstation in accordance with the subject invention having a central processing unit 10, such as a conventional microprocessor, and a number of other units interconnected via a system bus 12. The workstation shown in FIG. 1 includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network and a display adapter 36 for connecting the bus to a display device 38. The workstation has resident thereon the AIX operating system and the computer software making up this invention which is included as a toolkit.

Figure 2:
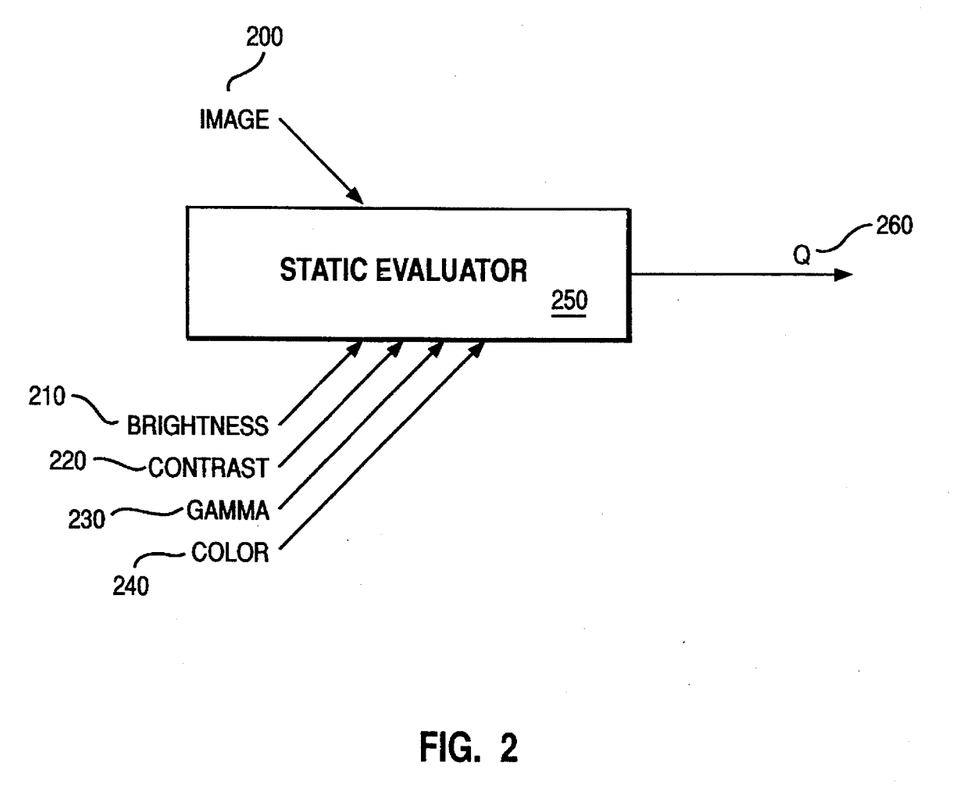
FIG. 2 is an illustration of an image enhancement system in accordance with the subject invention.
Figure 3A:
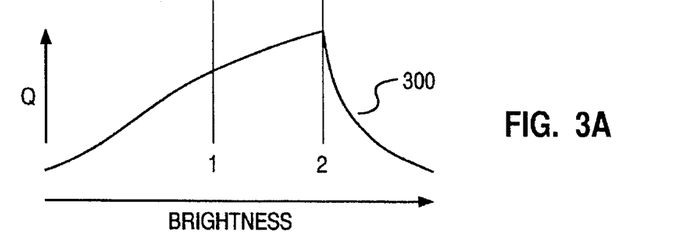
FIGS. 3A, 3B, 3C, 3D are illustrations of the sequential steps in an image enhancement technique for optimizing brightness in accordance with the subject invention.
Figure 3B:
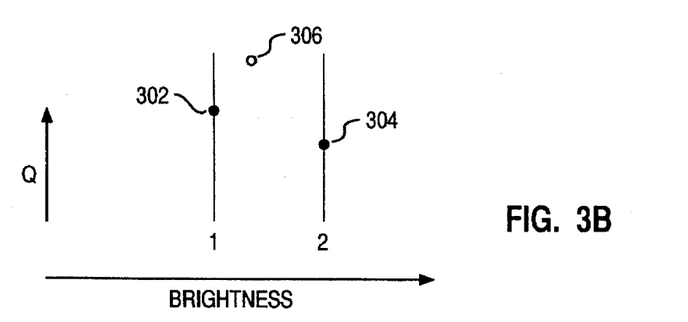
Figure 3C:
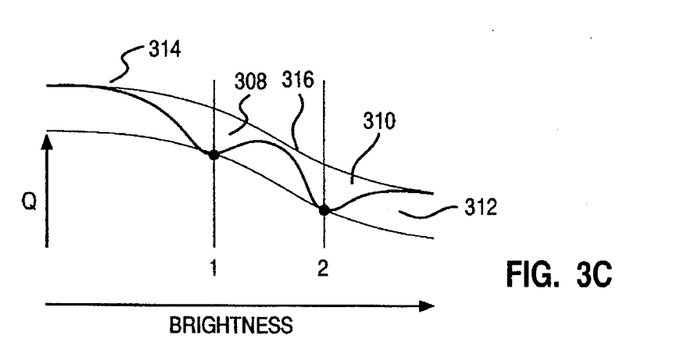
Figure 3D:
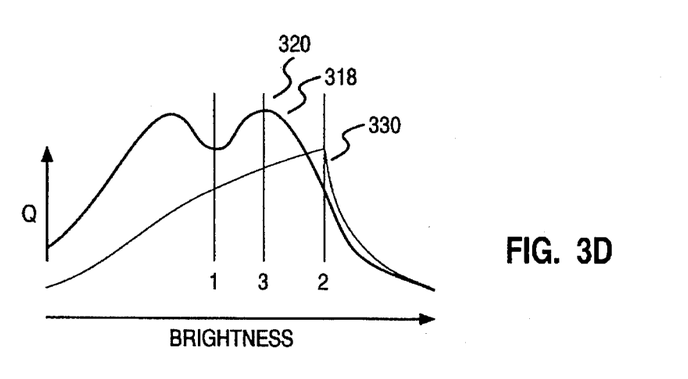

There are several ways the invention can be implemented using the techniques known in the art of expert systems. FIG. 2 illustrates one implementation of logic that models human reasoning in evaluating the quality of an image. The block inputs an image, and specific settings for adjustments to that image available for the system to affect. These inputs typically include: white level, black level, and gamma for each of the three colors; and the two potentially subtractive crosscolors for each of the three colors. The estimate of quality is typically based on uniformity of gray-scale distribution and percent of pixels in saturation. Based on those specific settings, the block outputs a numerical expected quality level Q. As the input controls are varied, so is Q, thus mapping Q into an N dimensional space, where N is the number of controls.

FIG. 3 illustrates the simple case of N=1 dimensions. For this case, there is only one variable, brightness. As brightness varies, the block calculates a quality curve 300. The system is given an initial input image with a brightness at state 302. The system then calculates what it thinks is an optimum brightness at state 304 and presents both to a user for selection of the best perceived brightness.

For example, if a user selected state 302 as the preferable state, the system knows that state 302 actually has a better quality than state 304. The system also assumes that there is some state with a still better quality 306. The system must make this assumption to attempt to improve the perceived image. If this assumption is incorrect, then the user will keep selecting the old values and eventually terminate successfully.

In order to make the quality of state 302 higher than state 304, the system must multiply the curve of the initial estimate 300 by another curve that reaches an appropriately higher number 308 at state 302 than the number 310 at state 304 to overcome the original curve 300 and attain the desired difference between the two empirical quality levels 302 and 304. The system determines the curve at other points by using a spline fitting function to obtain curve 312.

The system must assume that there is a better state 306 that has not been found. The system uses this knowledge to create another curve 314 as though the curve intercepts at point 306. Then, the system generates a third curve 316 between the first two curves that touches curve 312 at empirically determined points 308 and 302, and rises to the second curve in between the two other curves. The initial estimate 300 is multiplied by this curve 316 to yield the new quality estimate curve 318.

The peak of this new curve 320 is presented to the user as the next candidate state 320 to compare with the previously best state 304. Now, the system has three empirically determined points and ordered states. Based on the three points, the method is repeated to determine a fourth candidate, and so on until a user determines that the choice is adequate.

The selection is normally multidimensional, and although the mathematics gets more complex, the principle of empirically determining points, fitting a spline, and multiplying the predicted quality curve remains the same.

Figure 4:
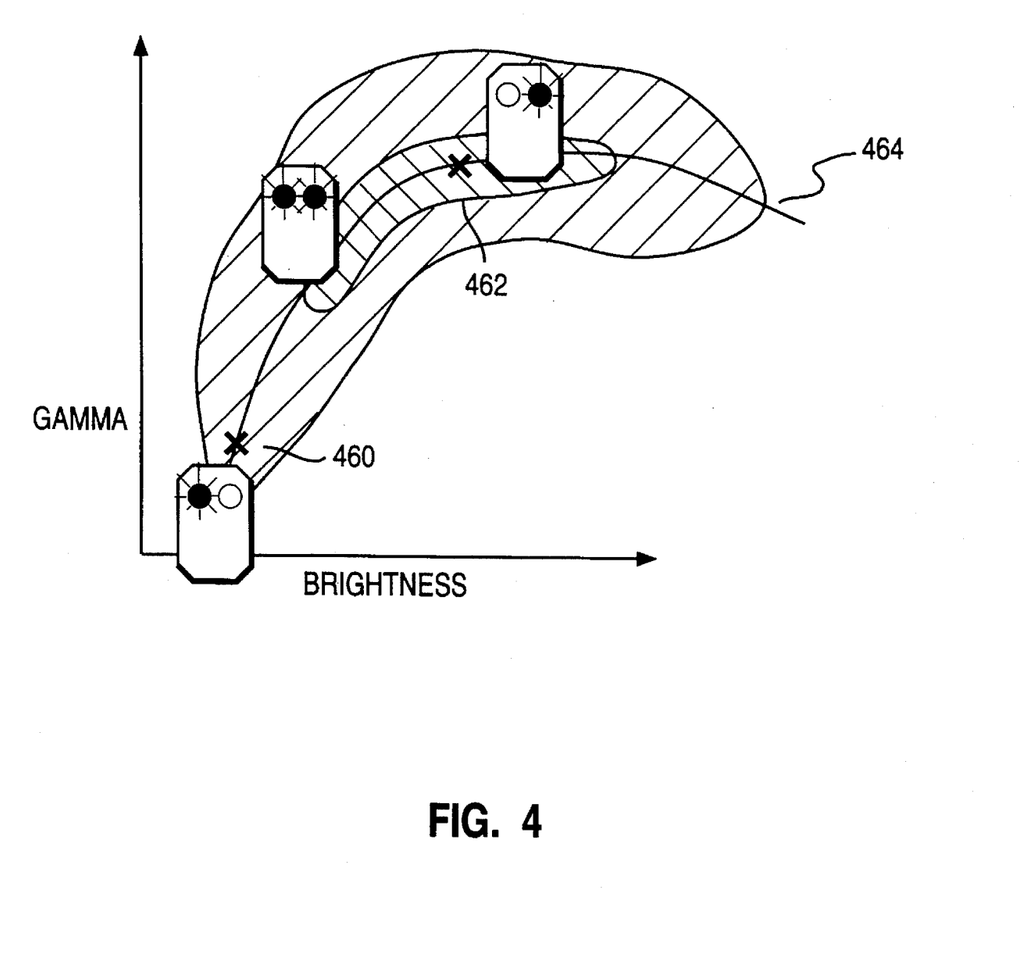
FIG. 4 is an illustration of an image enhancement technique that optimizes brightness as a function of gamma in accordance with the subject invention.

FIG. 4 illustrates the case for two dimensions. A previous state 460 is compared with a new candidate state 462 which is at the multidimensional maximum of the predicted quality function. In this particular implementation the user presses the left mouse button to display the previous best state, the right mouse button to display the candidate state, and both mouse buttons simultaneously to select as empirically best the state currently being displayed.

FIG. 4 also allows an additional selection technique. Out of the N dimensional state, the system selects a one dimensional line 464 cresting along the predicted quality maxima between the previous best state, and the new candidate state. At any time, the user may move the mouse to traverse this line and thus select the optimum magnitude of the correction. Multidimensional adjustments tend to confuse the human system. However, a continuous choice along a single dimension is usually easy.

Figure 5:
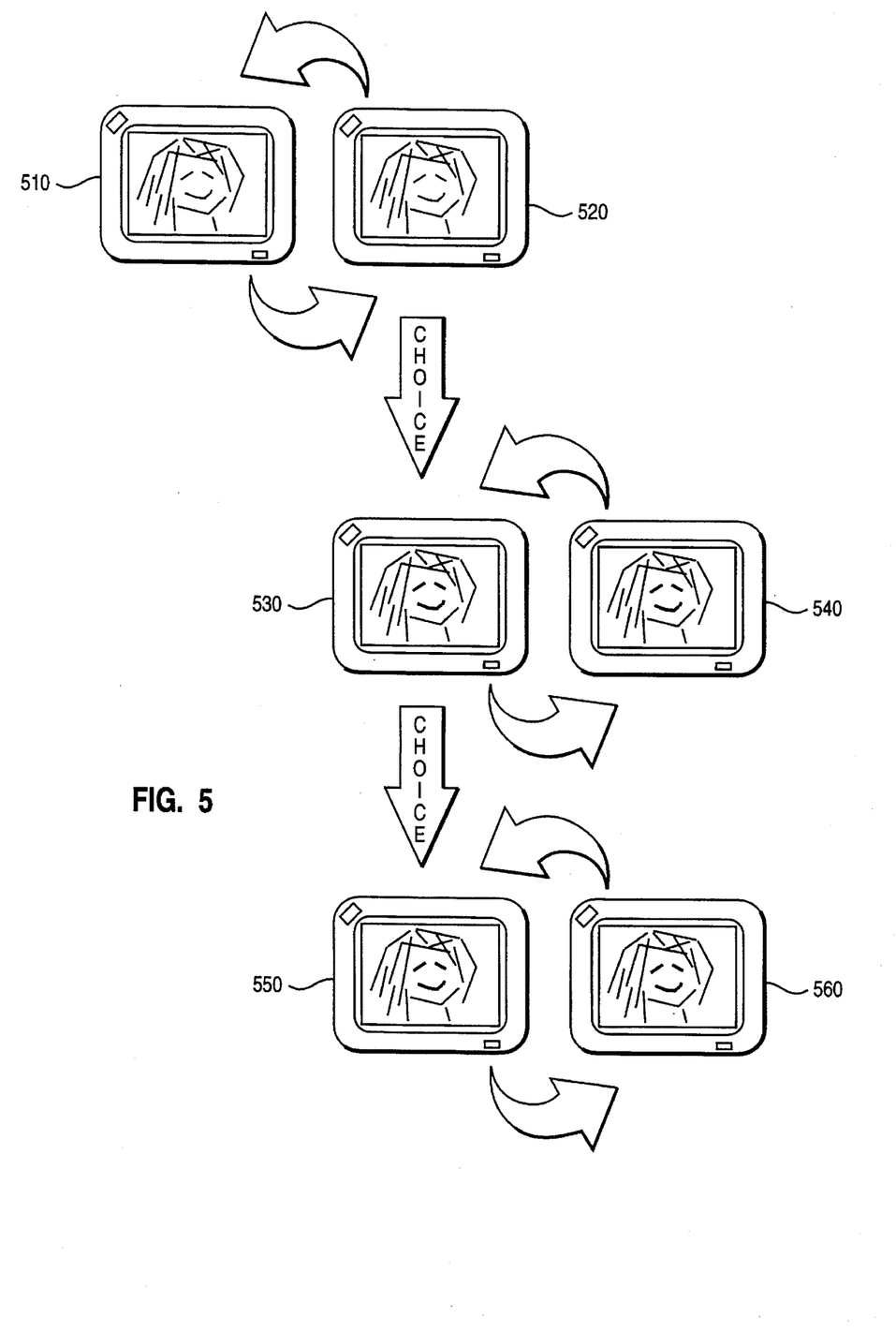
FIGS. 5 and 6 are illustrations of display processing of an image enhancement system in accordance with the subject invention.

FIG. 5 is an example of the selection process in accordance with the subject invention. A user is presented with two choices 510 and 520 based on the approaches described above. The selected choice 520 is further refined into 530 and 540. The next selected choice, 530 is further refined into 550 and 560 until no further refinement can occur.

Figure 6:
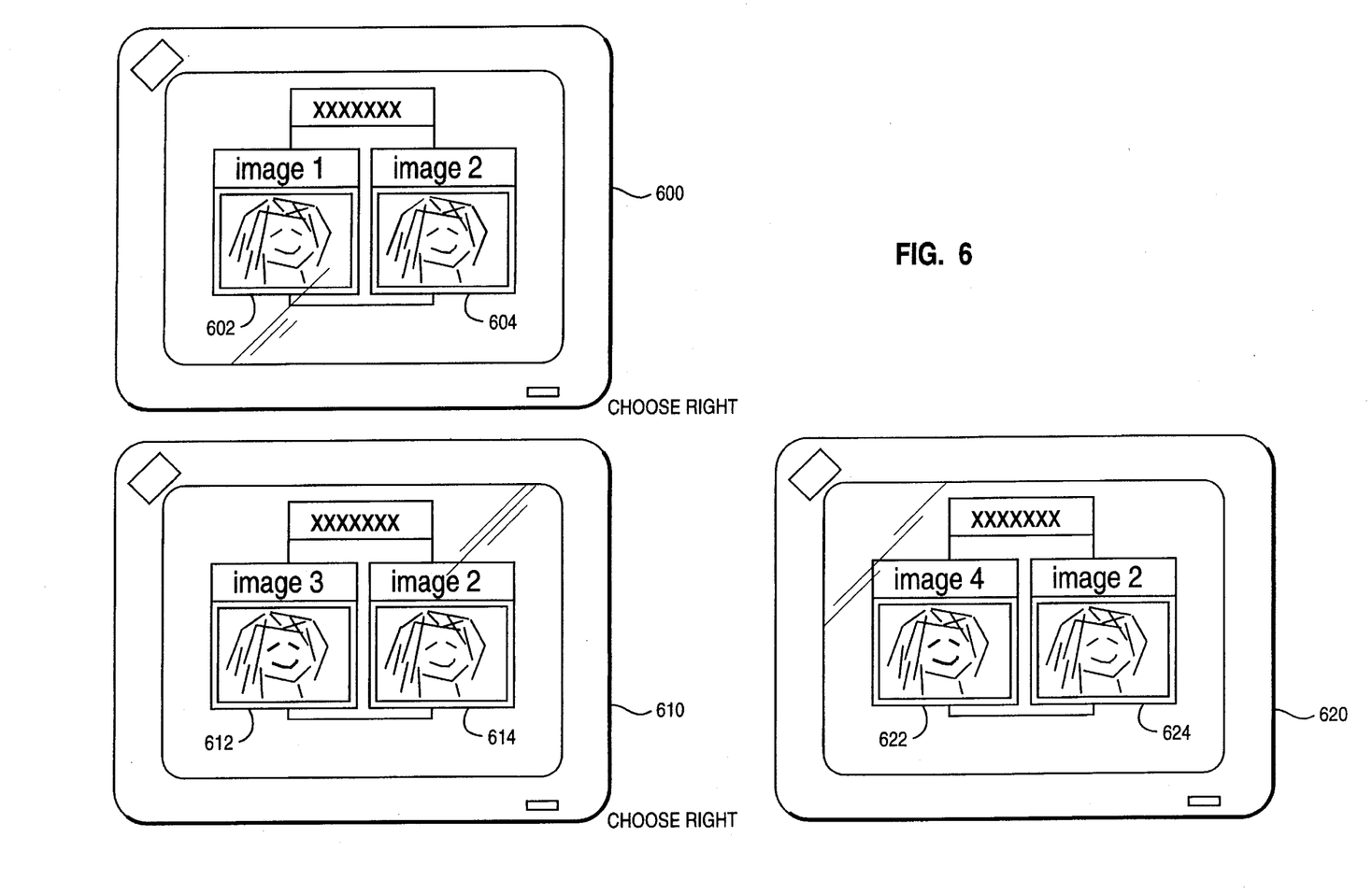

FIG. 6 is another example of the selection process in accordance with the subject invention. The user is presented with a display 600 which includes two images 602 and 604 side by side. Then, the user selects the image that best matches the user's tastes. This processing continues with 610 where the selected screen from 600 is further refined into 612 and 614. Then, a final pair of selection 622 and 624 are created and displayed on display 620 for the user's final choice.

Figure 7:
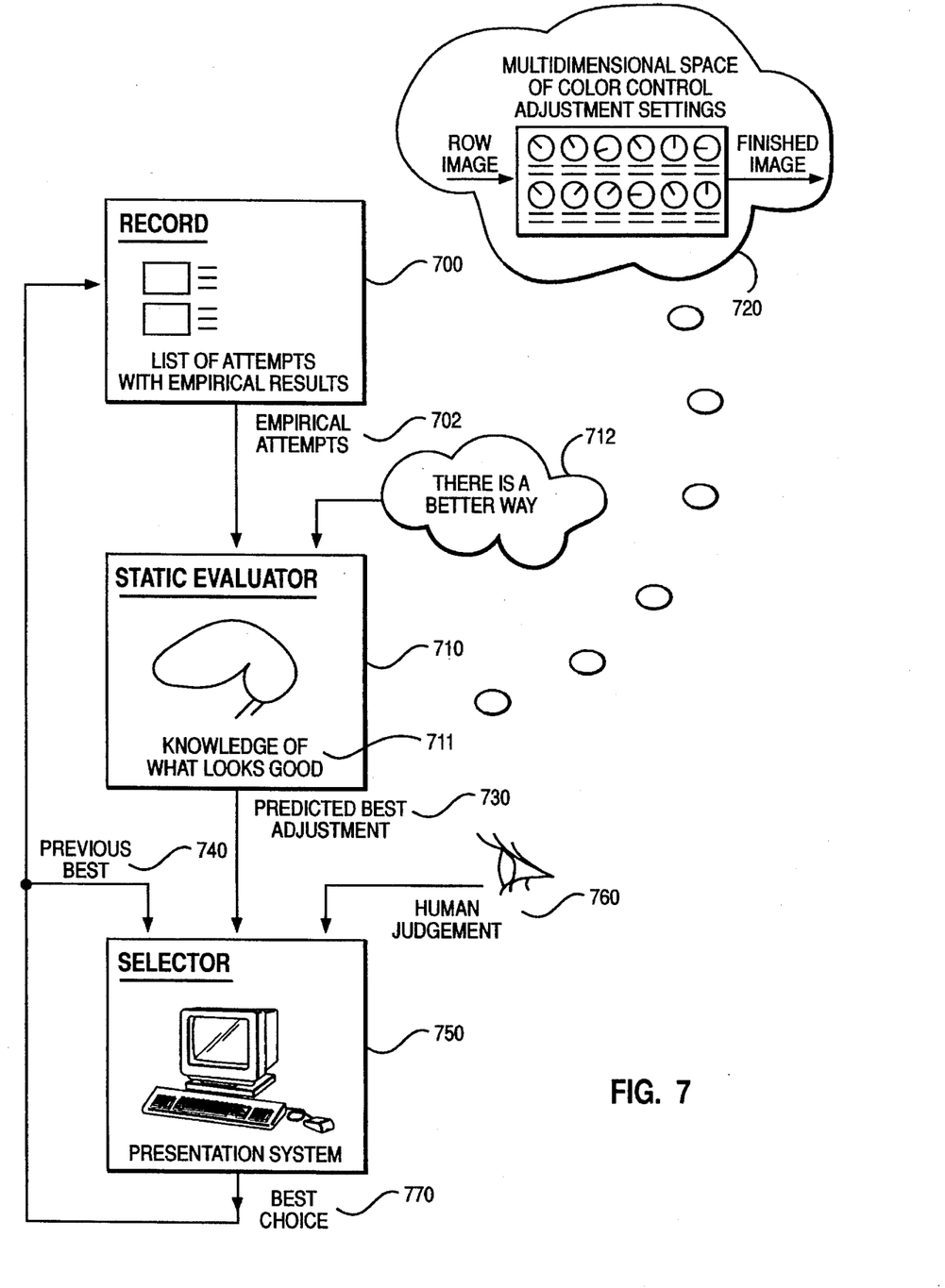
FIG. 7 is a flowchart of the detailed logic in accordance with the subject invention.

FIG. 7 is a flowchart of the detailed logic in accordance with the subject invention. The Static Evaluator 710 uses knowledge of what looks good 711 to predict image quality for any given setting of available controls 720. Using this information, it scans a multidimensional color control space 720 to identify the predicted best image adjustment 730.

The Selector 750 receives as input the predicted best image adjustment 730 and applies this adjustment to the image. The adjusted image is presented along with the previous best image to the human operator as shown in 750. The Selector block 750 allows an operator to select the best image along a line continuum connecting the two images, or provide another control. In any case, the operator picks the best image 760.

The Record block 700 catalogs this best choice, and keeps a record of the past choices in the order in which they were picked. This recording quantifies relative quality by empirical measurement for selected points in the multidimensional space of image controls.

The Static Evaluator 710 receives the empirical data as input and modifies its knowledge of what looks good to conform with the measurement data. The Static Evaluator also receives as input another critical assumption. This assumption is that the best image has not yet been created. The system iterates until the user 760 selects a finished image (best choice) 770.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A computer based apparatus far automated image enhancement, comprising:

(a) means for enhancing an image according to a multidimensional enhancement function to produce and present a plurality of enhanced images on a display, each of said enhanced images having different parameter values for said multidimensional enhancement function;

(b) means for prompting a user to select a single image from the plurality of images as the one best meeting the user's requirements;

(c) means for automatically adjusting said multidimensional enhancement function based on the specific parameter values of said user selection; and (d) means for repeating steps (a), (b) and (c) until the user indicates the image enhancement is completed.

2. An apparatus as recited in claim 1, wherein the multidimensional enhancement function of the means for enhancing the image represents an image quality function and is based on a plurality of parameter values for image enhancement that are initially determined by the user.

3. An apparatus as recited in claim 2, wherein the plurality of parameter values include image white level.

4. An apparatus as recited in claim 2, wherein the plurality of parameter values include image black level.

5. An apparatus as recited in claim 2, wherein the plurality of parameter values include image gamma for each of a plurality of colors in the image.

6. The apparatus of claim 2, wherein the multidimensional enhancement function represents a multidimensional surface having a theoretical maximum image quality based on said selected parameter values and said user selections.

7. The apparatus of claim 6, where in the means for enhancing further comprises:

means for determining a theoretical maximum image quality based on said user selection and said multidimensional enhancement function; and means for determining image quality values surrounding the theoretical maximum to generate alternate enhanced images.

8. The apparatus of claim 1, wherein said means for automatically adjusting comprises an expert system.

9. The apparatus of claim 8, wherein said expert system is a goal maximization expert system.

10. A computer implemented method for image enhancement, comprising the steps of:

(a) enhancing an electronically stored image according to a multidimensional enhancement function to produce and present a plurality of enhancement images on a display, each of said plurality of enhanced images having a different set of image parameter values;

(b) prompting a user to select a single image from the plurality of images as the one best meeting the user's requirements;

(c) automatically modifying the multidimensional enhancement function based on the image parameter values of the image selected by the user; and (d) repeating steps (a), (b) and (c) until the user indicates the image enhancement is completed.

11. A method as recited in claim 10, wherein the step of enhancing the image includes the step of receiving a plurality of image parameter values initializing the image enhancement function.

12. A method as recited in claim 11, wherein the plurality of image parameter values include image white level.

13. A method as recited in claim 11, wherein the plurality of image parameter values include image black level.

14. A method as recited in claim 11, wherein the plurality of image parameter values include image gamma for each of a plurality colors in the image.

15. The method of claim 10, wherein said multidimensional enhancement function represents a quality function of said plurality of image parameter values and wherein said step of automatically modifying the multidimensional enhancement function includes the steps of:

testing said selected image to determine said plurality of image parameter values;

applying an expert system to modify said multidimensional enhancement function based on said plurality of image parameter values and a previous hypothetical maximum quality level;

generating a new hypothetical maximum quality level based upon said modified multidimensional enhancement function.

16. A computer program product for use with a computer implemented image enhancement system, said computer program product comprising:

a computer usable medium having computer readable program code means embodied in said medium for causing said computer implemented image enhancement system to automatically enhance an image, said computer program product having:

computer readable program code means for causing a computer to enhance an image according to a multidimensional enhancement function to produce and present a plurality of enhanced images on a display, each of said enhanced images having different parameter values for said multidimensional enhancement function;

computer readable program code means for causing a computer to prompt a user to select a single image from the plurality of images as the one best meeting the user's requirements;

computer readable program code means for causing a computer to automatically adjust said multidimensional enhancement function based on the specific parameter values of said user selection; and computer readable program code means for causing a computer to repeat steps (a), (b) and (c) until the user indicates the image enhancement is completed.

* * * * *